(12) United States Patent
Haeussler et al.

(10) Patent No.: US 9,493,156 B2
(45) Date of Patent: Nov. 15, 2016

(54) METHOD AND DEVICE FOR STABILIZING A VEHICLE COMBINATION MADE UP OF A TRACTOR VEHICLE AND A TRAILER

(71) Applicant: Robert Bosch GmbH, Stuttgart (DE)

(72) Inventors: Thomas Haeussler, Kuenzelsau-Vogelsberg (DE); Benjamin Baust, Freiberg/Neckar (DE); Markus Beisswenger, Schwaebisch Hall (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/651,662

(22) PCT Filed: Nov. 28, 2013

(86) PCT No.: PCT/EP2013/074934
§ 371 (c)(1),
(2) Date: Jun. 11, 2015

(87) PCT Pub. No.: WO2014/090578
PCT Pub. Date: Jun. 19, 2014

(65) Prior Publication Data
US 2015/0314782 A1    Nov. 5, 2015

(30) Foreign Application Priority Data

Dec. 12, 2012 (DE) .................. 10 2012 222 862

(51) Int. Cl.
*B60R 22/00* (2006.01)
*G05D 1/00* (2006.01)
*G05D 3/00* (2006.01)
(Continued)

(52) U.S. Cl.
CPC .............. *B60W 30/02* (2013.01); *B60W 10/18* (2013.01); *B60W 10/184* (2013.01); *B60W 10/20* (2013.01); *B62D 6/002* (2013.01); *B62D 13/00* (2013.01); *B60W 2030/043* (2013.01);
(Continued)

(58) Field of Classification Search
CPC .... B60W 30/02; B60W 10/18; B60W 10/20; B60W 10/06; B60W 10/184; B60D 6/00
USPC ..................... 701/48, 41, 70; 280/432, 455.1
See application file for complete search history.

(56) References Cited

U.S. PATENT DOCUMENTS

2005/0161901 A1* 7/2005 Ahner et al. .............. B60T 7/20
                                                          280/432
2006/0204347 A1  9/2006 Waldbauer et al.

FOREIGN PATENT DOCUMENTS

DE        102004010296      12/2004
DE          10342865         4/2005
(Continued)

OTHER PUBLICATIONS

English Translation of DE10342865A1.*
(Continued)

*Primary Examiner* — Jelani Smith
*Assistant Examiner* — Mahmoud Ismail
(74) *Attorney, Agent, or Firm* — Norton Rose Fulbright US LLP; Gerard Messina

(57) ABSTRACT

A method and a device are provided for stabilizing a vehicle combination made up of a tractor vehicle and a trailer in case of fishtailing motions, in which—the presence of a fishtailing motion of the tractor vehicle is detected,—after the exceeding of a first threshold value by the amplitude of an oscillating fishtailing variable characterizing the fishtailing motion, a driver-independent steering intervention in the steering actuator system of the tractor vehicle takes place and—after the exceeding of a second threshold value by the amplitude of the fishtailing variable, a driver-independent braking intervention in the brake actuator system of the tractor vehicle takes place,—the second threshold value being selected to be greater than the first threshold value.

14 Claims, 2 Drawing Sheets

(51) Int. Cl.
  *G06F 7/00* (2006.01)
  *G06F 17/00* (2006.01)
  *B60W 30/02* (2012.01)
  *B60W 10/18* (2012.01)
  *B62D 6/00* (2006.01)
  *B62D 13/00* (2006.01)
  *B60W 10/184* (2012.01)
  *B60W 10/20* (2006.01)
  *B60T 7/12* (2006.01)
  *B62D 53/06* (2006.01)
  *B60D 1/32* (2006.01)
  *B60W 30/04* (2006.01)

(52) U.S. Cl.
  CPC ..... *B60W 2520/14* (2013.01); *B60W 2520/22* (2013.01); *B60W 2710/182* (2013.01); *B60W 2710/207* (2013.01); *B60W 2720/14* (2013.01); *B60Y 2200/147* (2013.01)

(56) References Cited

FOREIGN PATENT DOCUMENTS

| | | | |
|---|---|---|---|
| DE | 10342865 A1 * | 4/2005 | ............... B60T 7/12 |
| DE | 102005028787 | 5/2006 | |
| DE | 102007008342 | 8/2008 | |
| DE | 102007061835 | 6/2009 | |
| JP | 2006-505442 A | 2/2006 | |
| JP | 2007-069907 A | 3/2007 | |
| JP | 2008-087529 A | 4/2008 | |
| JP | 2009-012488 A | 1/2009 | |

OTHER PUBLICATIONS

International Search Report for PCT/EP2013/074934, issued on Feb. 25, 2014.

* cited by examiner

METHOD AND DEVICE FOR STABILIZING
A VEHICLE COMBINATION MADE UP OF A
TRACTOR VEHICLE AND A TRAILER

BACKGROUND INFORMATION

A system for stabilizing vehicle combinations is known from German Published Patent Application No. 10 2005 028 787 A1. It includes a vehicle steering having driver support and a device for detecting critical trailer oscillations. Upon detection of a critical trailer oscillation, a temporary intervention takes place in the vehicle steering, so as to stabilize the vehicle combination. This may take place passively, that is, without a steering motion not intended by the driver. However, an active intervention, within the meaning of an actual steering motion, is also possible. This increases the driving safety when guiding a vehicle combination. This system is particularly suitable for passenger motor vehicles.

SUMMARY

The present invention relates to a method for stabilizing a vehicle combination made up of a tractor vehicle and a trailer in the case of fishtailing motions, in which the existence of a fishtailing motion of the tractor vehicle is detected, after the exceeding of a first threshold value by the oscillating fishtailing variable characterizing the amplitude of the fishtailing motion, a driver-independent steering intervention takes place in the steering actuating system of the tractor vehicle and after the exceeding of a second threshold value by the amplitude of the fishtailing variable, a driver-independent braking intervention takes place in the brake actuator system of the tractor vehicle, the second threshold value being selected to be greater than the first threshold value.

Because of the graded procedure, a vehicle combination stabilization is made possible that is particularly comfortable for the driver.

One advantageous embodiment of the present invention is characterized in that the steering intervention is carried out only if the growth with time of the amplitude value of the fishtailing variable is so slow that the amplitude difference of two successive oscillations does not exceed a threshold value.

One advantageous embodiment of the present invention is characterized in that the driver-independent steering intervention represents a hardening of the steering in the direction of the oscillating fishtailing variable or the yaw rate oscillation. Because of the hardening of the steering, an effective damping takes place of the undesired yawing oscillations of the vehicle.

One advantageous embodiment of the present invention is characterized in that the driver-independent steering intervention represents a superposition of the steering torque, which is in each case directed opposite to the instantaneous direction of the oscillating fishtailing variable or the yaw rate oscillation. Because of this superposition of the steering torque, the driver is instructed to steer in-phase against the oscillating fishtailing variable.

One advantageous embodiment of the present invention is characterized by the fact that the fishtailing variable is the difference between the setpoint yaw rate and the actual yaw rate of the tractor vehicle. These variables are recorded in any case within the scope of a driving dynamics regulating system, and are therefore available without great additional expenditure.

Another advantageous embodiment of the present invention is characterized in that the fishtailing variable is the actual yaw rate of the tractor vehicle.

One advantageous embodiment of the present invention is characterized in that the driver-independent braking intervention represents a symmetrical braking of the left and right wheel of at least one vehicle axle. Consequently, a uniform and rapid deceleration of the vehicle is achieved until the vehicle speed drops below a threshold value below which no further trailer oscillating is possible.

One advantageous embodiment of the present invention is characterized in that the driver-independent braking intervention represents alternating braking of the left and right wheel of at least one vehicle axle, the phase position of the alternating braking being selected so that the oscillating yaw torque produced by the braking intervention is phase-shifted by approximately 180 degrees from the oscillating fishtailing variable. Thereby, the yawing torque created by the fishtailing is compensated for and the trailer is stabilized again.

One advantageous embodiment of the present invention is characterized in that the first threshold value is selected to be so low that there is not yet present any critical fishtailing situation for the vehicle combination. With that, there is a great probability that, just because of the steering interventions, a stabilization of the vehicle combination is possible, and consequently, a stabilization less comfortable for the driver is avoided by speed-reducing braking interventions.

Furthermore, the present invention includes a device, particularly a control unit, which includes means designed to implement the methods of the present invention. By the term means, one should understand in this context, particularly the program code of the methods according to the present invention.

DETAILED DESCRIPTION

What is important for the present invention is the robust and early detection of vehicle combination fishtailing situations, which are able to be stabilized by damping steering interventions. Such driving situations are present when the yaw rate amplitude of the vehicle, applied by the trailer, increases only slowly and includes no jumps.

Figure 1:
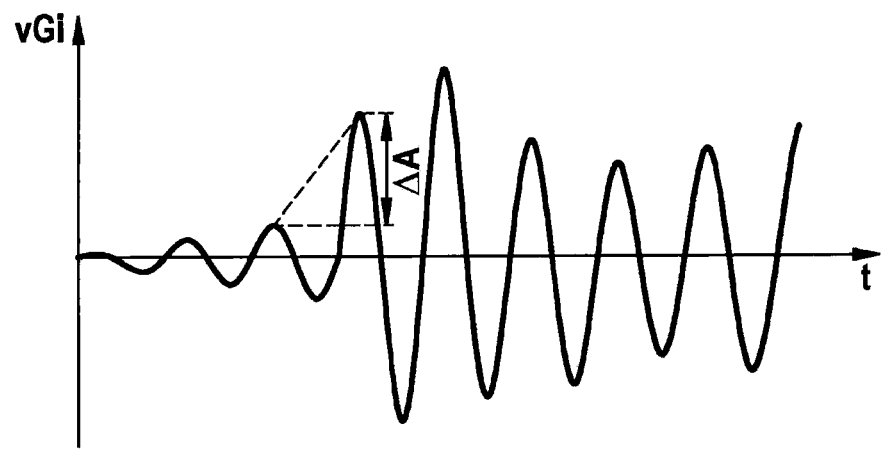
FIG. 1 shows the time curve of an oscillation increasing rapidly in amplitude, having a jump in amplitude.

In FIG. 1, a rapidly increasing oscillation is shown, for example, having an amplitude jump. To that end, time t is plotted in the abscissa direction and yaw rate vGi of the tractor vehicle in the ordinate direction. Amplitude jump AA is easy to recognize, which characterizes a rapid increase in amplitude of the oscillation.

Figure 2:
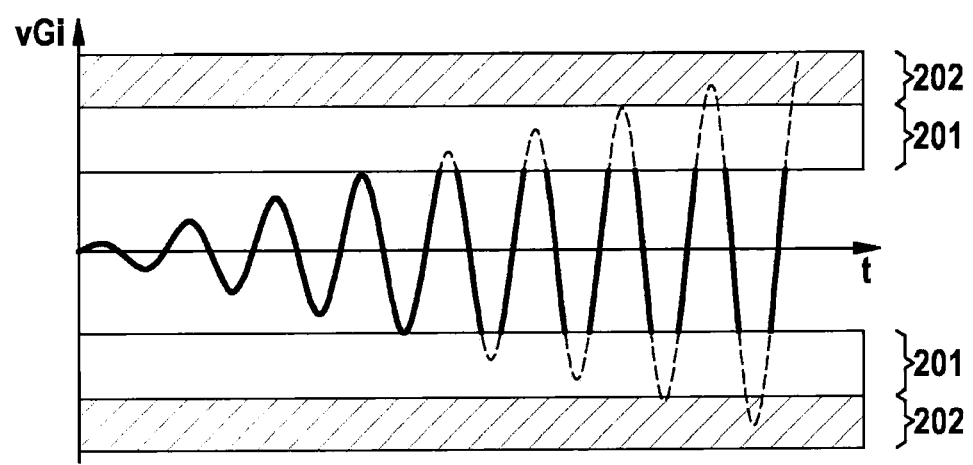
FIG. 2 shows an oscillation increasing slowly in amplitude and the control range for the stabilization by braking measures and the stabilization by steering measures.

The control threshold value of the stabilizing steering interventions is less than the control threshold value for braking interventions, whereby a comfortable stabilization of the vehicle combination is made possible, and critical situations are able to be prevented at the same time. This is illustrated in FIG. 2. There, time t is plotted in the abscissa direction and yaw rate vGi of the tractor vehicle in the ordinate direction. Furthermore, in FIG. 2, the two yaw rate band ranges 201 and 202 are drawn in. If the amplitude of the yaw rate oscillation is in range 201, steering interventions for damping the oscillations are used. However, if the amplitude increases still further, and lies in range 202, stabilizing braking interventions are used.

Various intervention strategies are suitable for steering support:
- the steering is temporarily hardened in the direction which is directed opposite to the steering torque induced by the yaw rate oscillation. Because of that, the steering angle remains uninfluenced by the yawing motion of the vehicle.
- a superposition of the steering torque is specified as a steering recommendation in such a form that the vehicle combination is stabilized if the driver follows the recommendation.

By a simultaneous or subsequent deceleration of the vehicle combination to below a critical speed, hard braking interventions may be avoided. Instead, the deceleration may optionally be generated by engine torque adaptations or light braking interventions.

Figure 3:
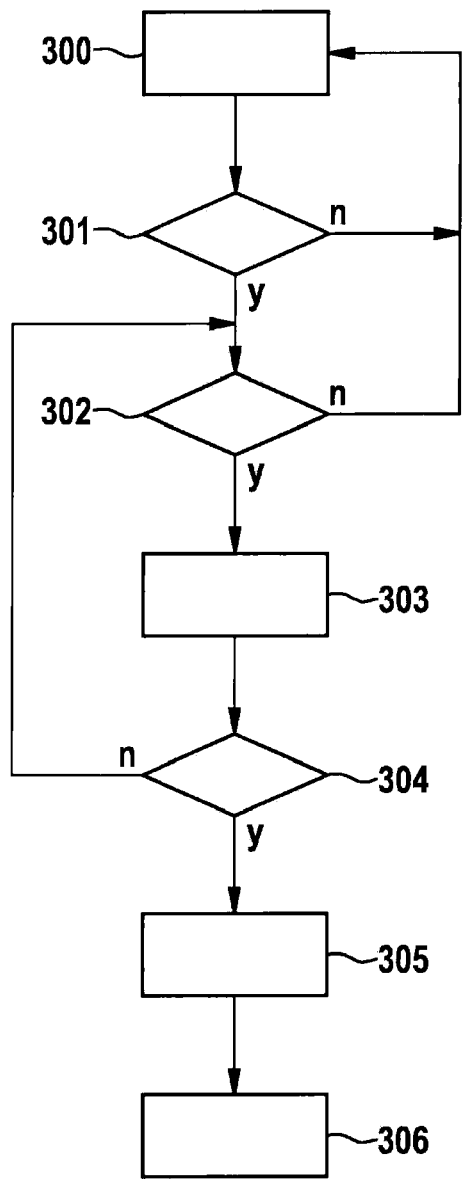
FIG. 3 shows the sequence of a specific embodiment of the method according to the present invention, as a flow chart.

FIG. 3 shows the sequence of the method according to the present invention. After the start of the method in block 300, in block 301 the presence of a fishtailing motion of the tractor vehicle is detected. If no fishtailing motion exists, then there is a branching back to block 300. If there is fishtailing motion, it is queried in block 302 whether its amplitude exceeds a first threshold value. If this is not the case, then a return to block 300 takes place. However, if it is the case, then in block 303 a driver-independent steering intervention is carried out in the steering actuator system of the tractor vehicle. In block 304 it is then queried whether the amplitude of the fishtailing variable exceeds a second threshold value. If this is not the case, then the system jumps back the input to block 302. However, if it is the case, then in block 305 a driver-independent braking intervention is carried out in the braking actuator system of the tractor vehicle. The second threshold value is larger than first threshold value, in this instance. The method ends in block 306.

What is claimed is:

1. A method for stabilizing a vehicle combination made up of a tractor vehicle and a trailer in case of a fishtailing motion, comprising:
   detecting a presence of the fishtailing motion of the tractor vehicle;
   determining whether an amplitude of an oscillation characterizing the fishtailing motion exceeds either of a first and a second threshold value, the second threshold value being greater than the first threshold value; and
   responsive to determining that the amplitude exceeds at least one of the first and second threshold values, performing a driver-independent intervention in an actuator system of the tractor vehicle, wherein the performing of the driver-independent intervention includes selecting either a steering intervention and a steering actuator system as the driver-independent intervention and actuator system or a braking intervention and a braking actuator system as and the driver-independent intervention and the actuator system according to a condition that (a) the steering intervention and steering actuator system are selected if the amplitude exceeds the first threshold value and not the second threshold value and (b) the braking intervention and the braking actuator system are selected if the amplitude exceeds the second threshold value.

2. The method as recited in claim 1, wherein the steering intervention is carried out only if a growth with time of an amplitude value of the oscillation fishtailing variable is so slow that an amplitude difference of two successive oscillations does not exceed a threshold value.

3. The method as recited in claim 1, wherein the driver-independent steering intervention includes represents a hardening of the steering in the a direction of that is opposite to a direction of a steering torque induced by the fishtailing variable motion that is characterized by the oscillation.

4. The method as recited in claim 1, wherein the driver-independent steering intervention includes represents a superposition of a steering torque in a direction that is, which is in each case directed opposite to an instantaneous direction of the fishtailing variable motion that is characterized by the oscillation.

5. The method as recited in claim 1, wherein the oscillation fishtailing variable is of a value representing a difference between a setpoint yaw rate and an actual yaw rate of the tractor vehicle.

6. The method as recited in claim 1, wherein the oscillation fishtailing variable is of an the actual yaw rate of the tractor vehicle.

7. The method as recited in claim 1, wherein the driver-independent braking intervention includes a symmetrical braking of a left wheel and a right wheel of at least one vehicle axle.

8. The method as recited in claim 1, wherein:
   the driver-independent braking intervention includes an alternating braking of a left wheel and a right wheel of at least one vehicle axle, and
   a phase position of the alternating braking is selected so that an oscillating yawing torque generated by the braking intervention is phase shifted by approximately 180 degrees from the oscillating fishtailing variable oscillation.

9. The method as recited in claim 1, wherein the first threshold value is selected to be so low that there is not yet present any critical fishtailing situation for the vehicle combination.

10. A device, comprising:
    an arrangement for carrying out a method for stabilizing a vehicle combination made up of a tractor vehicle and a trailer in case of a fishtailing motion, the method comprising:
    detecting a presence of the fishtailing motion of the tractor vehicle;
    determining whether an amplitude of an oscillation characterizing the fishtailing motion exceeds either of a first and a second threshold value, the second threshold value being greater than the first threshold value; and
    responsive to determining that the amplitude exceeds at least one of the first and second threshold values, performing a driver-independent intervention in an actuator system of the tractor vehicle, wherein the performing of the driver-independent intervention includes selecting either a steering intervention and a steering actuator system as the driver-independent intervention and actuator system or a braking intervention and a braking actuator system and as the driver-independent intervention and the actuator system according to a condition that (a) the steering intervention and steering actuator system are selected if the amplitude exceeds the first threshold value and not the second threshold value and (b) the braking intervention and the braking actuator system are selected if the amplitude exceeds the second threshold value.

11. The device as recited in claim 10, wherein the amplitude is of a sinusoidal wave that represents the oscillation.

12. The device as recited in claim 11, wherein each of the first and second thresholds is a respective absolute value of a distance of a peak of the sinusoidal wave to a midline of the sinusoidal wave.

13. The method as recited in claim 1, wherein the amplitude is of a sinusoidal wave that represents the oscillation.

14. The method as recited in claim 13, wherein each of the first and second thresholds is a respective absolute value of a distance of a peak of the sinusoidal wave to a midline of the sinusoidal wave.

* * * * *